June 14, 1955 W. H. RUPP ET AL 2,710,790
LIQUID-LIQUID CONTACTING APPARATUS
Filed March 22, 1952 3 Sheets-Sheet 1
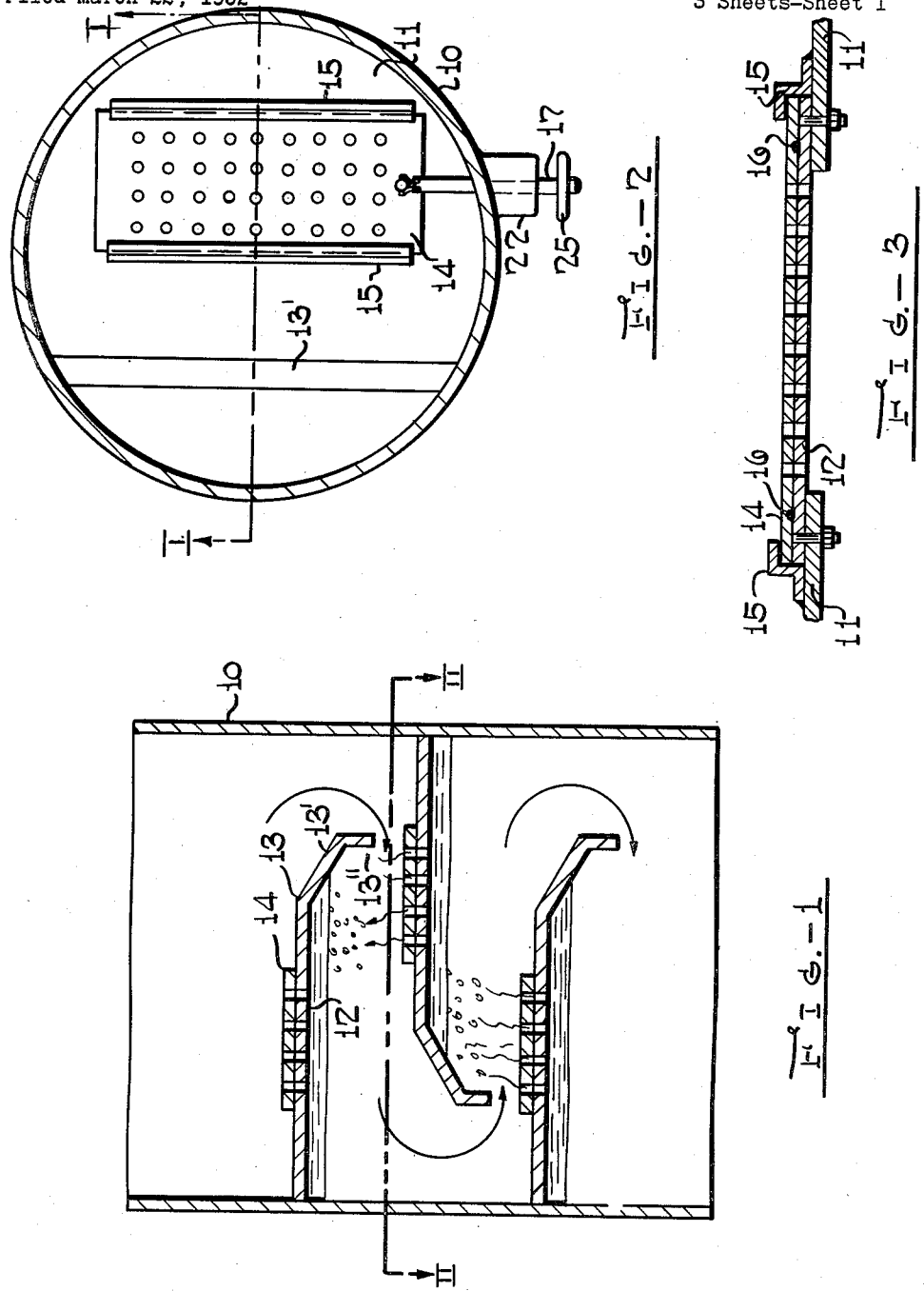
Walter H. Rupp
Clinton A. Holder   Inventors
Robert B. Long
By W. O. J. Heilman Attorney

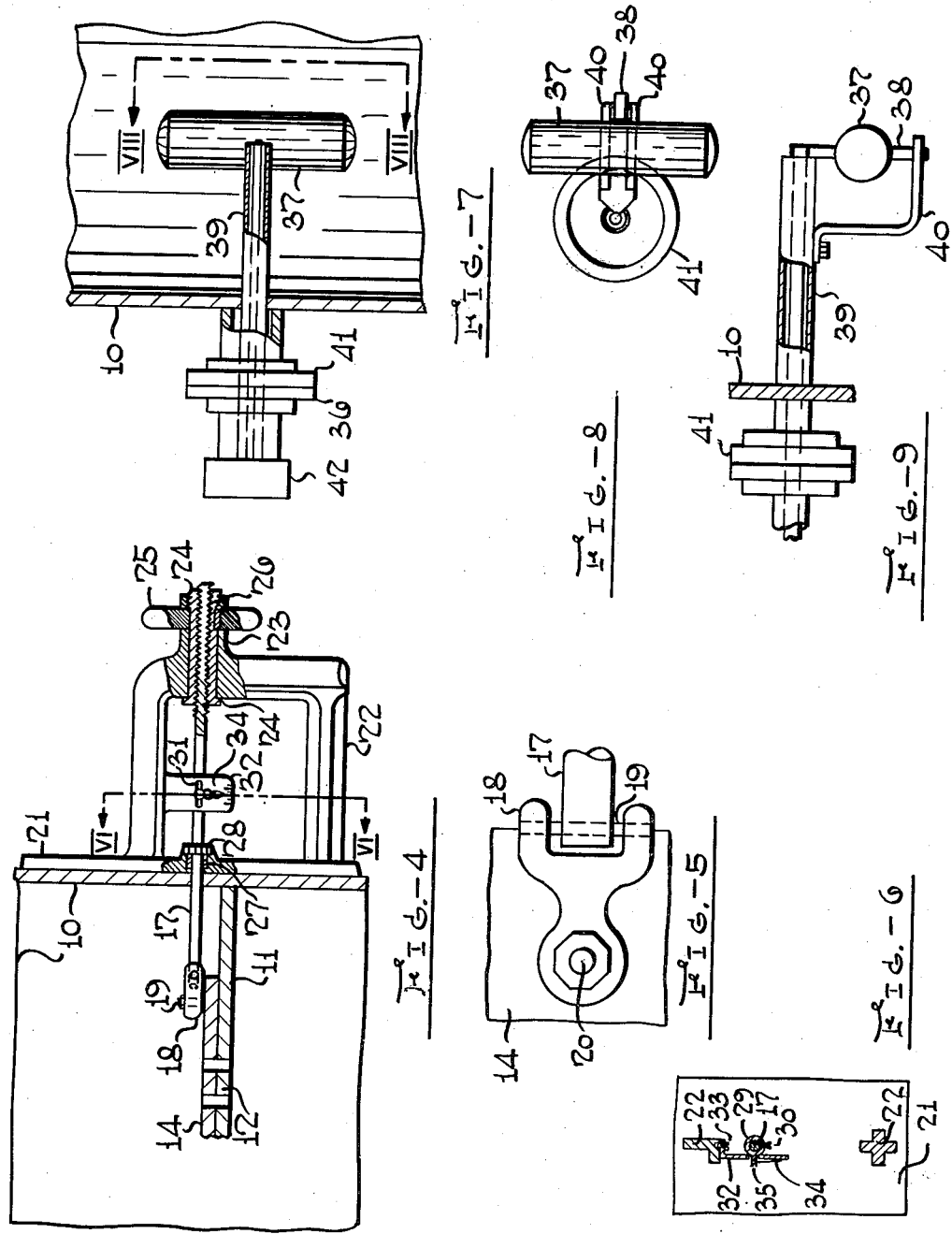

June 14, 1955 W. H. RUPP ET AL 2,710,790
LIQUID-LIQUID CONTACTING APPARATUS
Filed March 22, 1952 3 Sheets-Sheet 3
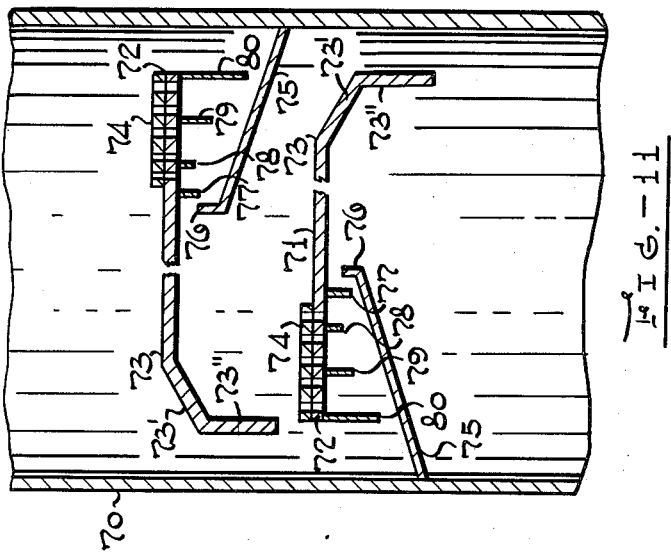
Walter H. Rupp
Clinton H. Holder  Inventors
Robert B. Long
By W. V. J Heilman Attorney

United States Patent Office 2,710,790
Patented June 14, 1955

2,710,790

LIQUID-LIQUID CONTACTING APPARATUS

Walter H. Rupp, Mountainside, Clinton H. Holder, Westfield, and Robert B. Long, Wanamassa, N. J., assignors to Esso Research and Engineering Company, a corporation of Delaware Application March 22, 1952, Serial No. 278,085

4 Claims. (Cl. 23—270.5)

This invention relates to novel liquid-liquid contacting apparatus. It is particularly adapted to apparatus used in the contacting of two substantially immiscible or partially miscible liquids as conducted in processes such as solvent extraction operations. More particularly the invention relates to an improved perforated plate column for use in such liquid-liquid contacting operations.

According to the preferred embodiment, the invention is directed to processes in which liquids are treated with selective solvents. At the present time there are a great many chemical processes in which a selective solvent is used to treat a particular liquid in order to secure a partial segregation, or removal of chemical constituents of the liquid. For example, petroleum oils are conventionally treated with solvents such as liquid sulfur dioxide, phenol, cresol, nitrobenzene, furfural, aniline, ether and other solvents or mixture of such solvents. Solvents of this nature are used to treat petroleum oils in order to remove low viscosity index constituents of the oil to obtain a treated oil having an improved viscosity index. More generally, such solvent treating processes are employed to selectively remove undesired constituents from the liquid being treated with the solvent or in some cases to recover desired constituents.

In solvent treating operations of the general character above described, many modifications are used to control the solvent extraction process as desired; for example, auxiliary solvents, or modifying agents may be injected into the treating system. Again a wide range of temperature and pressure conditions may be employed in particular types of solvent extractions. The present invention is not concerned with the modifications or refinements of solvent treating processes. However, the invention is concerned with the basic method and apparatus used for contacting liquids whatever the particular system may be. It is, therefore, to be understood that this invention is of application to any liquid-liquid contacting system with any of the modifications which may be employed in such processes.

Many methods have been devised for the contacting of liquids with liquids. However, it has been found more advantageous to effect large volume inter-liquid treating in contacting towers rather than in mixers and settlers, centrifuges, etc. Processing in towers is more advantageous from the economic viewpoint because of the lower investment and operating costs. Consequently, considerable attention has been given to the apparatus required for efficient liquid-liquid contacting in towers. The towers which have been employed have been of a wide variety of types, some employing various types of packing materials, others employing bubble cap plates, and others employing a wide variety of internal baffles. However, of the various types of fluid contacting towers developed, those involving the use of pierced plates have proved to be particularly advantageous in the processing of large quantities of liquids.

Conventional pierced plate towers consist of a large number of horizontally disposed perforated plates extending throughout the tower. The plate perforations provide orifices through which at least one of the liquids may be dispersed. Heretofore, the pierced plates known to the art have been characterized by plate efficiencies not substantially greater than about 50%. By plate efficiency as that term is used, it is meant that each plate is effective in accomplishing a percentage contacting efficiency of the contact achieved at equilibrium in a single batch stage mixer and settler. Thus one theoretical stage is established by contacting two liquids intimately in a batch mixer followed by a thorough settling in a batch settler. As stated, therefore, conventional pierced plate liquid contacting towers have relatively low plate efficiencies. It is clearly of the greatest importance to improve the plate efficiency of the types of pierced plates used in such towers in order to decrease the expense of the contacting and to decrease the size of the towers necessary.

In conventional perforated plate designs the head available for mixing varies with the flow rate and hence the mixing intensity and extraction efficiency changes with flow rate. It follows, therefore, that there is very little flexibility in the range of flow rates and in the rates of solvent-to-oil feed in conventional designs.

The above disadvantages are overcome according to this invention by providing means to vary the hole area in the plate. When applied to liquid-liquid extraction processes, this serves to control the interface at each tray. The interface level is a function of the flow rate through the holes and the differential gravity of the two phases so that the maximum head available is represented by the tray spacing multiplied by the differential gravity between the phases. The head is the pressure drop across the plate at any given hole setting. A given gravity differential between the phases will result in a definite interface level. This interface should not be too close to the top or bottom of the trays; otherwise entrainment of one phase in the other will result.

In the preferred embodiment, dispersion holes are provided only for the light phase and are located directly downstream of the heavy-phase downcomer. The major portion of the volume between trays is unagitated to facilitate separation of the phases. By controlling the pressure drop across the plate and hence the interface depth to maintain several inches of the light phase below the dispersion plates and by providing adequate settling area, intertray entrainment and recirculation known to occur in existing towers can be materially reduced. By this means, tray efficiencies of over 80% can be obtained. Furthermore, since, according to the design of this invention, dispersion area is controllable, the tower can be operated over a wider range of flow rate at constant efficiency.

To the accomplishment of the foregoing and related ends, the invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1 is a partial sectional elevation of a liquid-liquid contacting tower showing the general arrangement of the structure and counter-current movement of the liquids being contacted.

Figure 2 is a transverse section taken on the line 2—2 of Figure 1.

Figure 3 is an enlarged section showing in detail the gate disposed in sliding engagement in the guides and superimposed on the fixed perforated plate.

Figure 4 is a view showing the gate-actuating mechanism and the gate position indicator.

Figure 5 is a detailed top-view showing the universal joint connection of the gate to the actuating shaft.

Figure 6 is a section taken along the line 6—6 of Figure 4 showing the arrangement of the scales and indicator pointers.

Figure 7 is a detailed cross-section of the level indicator shown attached to the wall of the tower.

Figure 8 is a view taken along lines 8—8 of Figure 7.

Figure 9 is a top view of the level instrument of Figure 7.

Figure 10 is a partial sectional elevation of another embodiment of the invention.

Figure 11 represents still another embodiment of the invention in which provision is made for variation in the number as well as size of the dispersion holes in each plate.

Referring in detail to Figures 1–5, the numeral 10 designates a treating tower in which is provided a plurality of trays 11 with perforated sections 12, as shown in Figures 1 and 2. The perforated sections occupy only about 10–15% of the total tray area. Each tray is provided with downcomer 13, having 30° sloping section 13' and vertical portion 13". The downcomer 13 terminates above the next plate below at the edge of the perforated section on the plate below so that the heavy phase from a higher plate will flow to a lower plate and then across the perforated section.

Gate plates 14 are superimposed on perforated sections 12 and have the same size and spacing of openings. Alternatively, gate plates 14 may be placed below the perforated sections 12. Furthermore, the axis of the gate plates should be transverse to the direction of flow. The gate plates 14 are slidably mounted in guide members 15 secured to the structure by welding or in any other approved manner. A plurality of anti-friction rollers 16 are placed in semi-circular cut-outs in the lower edge of the plate 14. The gate plates are adjustable independently of each other so that the orifice size may be varied from zero to maximum depending upon the degree of mixing desired in the various parts of the tower. It is preferred to carry out this feature of this invention in the manner shown in Figure 4 where it will be seen that the gates 14 may be adjusted to any degree desired by means of a spindle 17 which is inserted at its inner end in a fork 18 mounted on swivel 19 for vertical motion. Fork 18 is provided with a rounded end portion mounted on swivel 20 for horizontal motion. The adjusting assembly, comprising a flange portion 21 and a yoke portion 22 is secured to the shell 10 of the tower.

The yoke portion as shown is formed of two or more webbed arms, of which two are opposed. The arms terminate in a collar portion 23. A sleeve 24 inserted in the yoke collar is flanged at its lower end and internally threaded. The sleeve 24 extending outward beyond the collar, has a shouldered portion on which is carried a hand wheel 25. The hand wheel is keyed to the sleeve and held in place by a nut 26 threaded on the sleeve end. Surrounding the spindle 17 is a packing material 27 held in place by a gland member 28 which may be forced against the packing.

It is imperative that the precise position of the gates 14 should be transmitted to the operator of the unit. This feature of the invention is carried out in the manner shown in Figures 4 and 6, where it will be seen that the indicator sleeve 29 has been secured to spindle 17 by means of a set screw 30. The sleeve has been formed with a rectangular portion slidingly fitted in a slot 31 provided in the graduated scale 32. The scale is secured to the yoke arm 22 by means of screws 33. The indicator pointers 34 are secured to the rectangular portion of sleeve 29 by screws 35.

It is also of importance that the operator be made aware at all times of the height of the liquid level on plates 11. This is accomplished by means of level controller 36 and shown in detail in Figures 7, 8, and 9. Referring, therefore, to these drawings, the level controller consists of a metal cylinder or float 37 mounted on a rigid torque arm 38 and attached to a torque tube 39 through bracket 40. Torque tube 39 is connected through the tower wall 10 and stuffing box 41 to indicator 42, where the change in buoyancy of the float 37 caused by the movement of the interface and transmitted by the torque tube is converted into air pressure by conventional means and indicated by means of a dial in terms of interface location. The movement of the float is restricted to the desired range by means of stop 42.

In considering the manner in which the apparatus illustrated in the drawings operates, it is assumed that the liquids to be contacted are phenol and oil. Phenol being introduced to the top of the tower and being of a greater density than oil, tends to flow downwardly through the tower countercurrent to the flow of oil introduced at the bottom of the tower. The phenol will substantially fill the tower as a continuous phase building up on the top of each tray 11 and filling the downcomers 13. The oil, on the other hand, will form a discontinuous phase and will build up in a layer beneath each tray behind the weir forming the downcomers 13. Because of the pressure differential in the tower resulting from the difference in gravity between the oil and the phenol, the oil will be jetted through the holes in the perforated section 12 and will mix with the phenol on the top of the plate. This mixture of oil and phenol will be carried along in the stream of phenol from the downcomer from the plate above and, in so doing, will separate, the phenol continuing to the next downcomer and the oil forming a layer under the next plate above where it will again be jetted into the next layer of phenol.

The depth of the oil layer is controlled by controlling the ratio of holes to solid plate in the perforated section. Thus internal recirculation of the oil and entrainment of oil in the phenol phase and phenol in the oil phase can easily be reduced by changing the location of oil-phenol interface which, in turn, is determined by the amount of hole area in the plate.

Referring now to Figure 10, a further embodiment of this invention is illustrated as applied to an extraction tower utilizing a somewhat different type of plate. In the extraction tower of Figure 10, the plates employed may be said to be an inverted arrangement of the plates illustrated in Figure 1. Furthermore, it may be noted that the apparatus of Figure 1 is particularly adapted to an extraction tower in which the heavy phase is maintained as the continuous phase throughout the tower, while the apparatus illustrated in Figure 10 is particularly adapted for use in an extraction tower wherein the light phase is maintained substantially continuous throughout the tower. As shown in Figure 10, tower 60 is provided with a plurality of trays 61 having perforated section 62. Each tray is provided with a weir 63 having an upwardly extending section 63' of 30° slope and a vertically extending section 63". Weir 63 terminates below the next plate above at the edge and forms a riser with the edge of the shell 60. Gate plates 64 are shown placed beneath perforated section 62, although they could be placed above the perforated section as shown in Figure 1, if desired. The construction of the gate plates and method of installation and operation are the same as gate plate 14 described in Figures 1 to 5.

In operating the embodiment of Figure 10, phenol is introduced at the top of the tower and flows down the tower countercurrent to the flow of oil introduced at the bottom. In this embodiment the oil will substantially fill the tower as a continuous phase building up beneath each plate 61 and filling the risers formed by weir 63 and the wall of the tower. The phenol, on the other hand, will form a discontinuous phase and will build up in a layer above each plate. In this embodiment the phenol will be jetted through the holes in the perforated section 62 and will mix with the oil beneath the plate.

In Figure 11, there is shown another embodiment of this invention in which the number as well as the size of the dispersion holes in each plate is varied. This is accomplished by providing a trap or liquid seal in the discontinuous phase to prevent the continuous phase from by-passing any plates at low flow rates and a series of baffles to vary the amount of dispersion area used by the discontinuous phase.

Referring now to Figure 11, numeral 70 designates a treating tower in which is provided a plurality of trays 71 spaced from both sides of the tower and having perforated sections 72 similar in all respects to those of Figures 1 and 2. Like the tray in Figure 1, tray 71 is provided with downcomer 73 having 30° inclined portion 73' and vertical portion 73''. Plate 71 is also provided with gate plates 74 to vary the size of the dispersion holes. The construction and operation of this gate plate is the same as gate 14 described in Figures 1 to 5. Beneath the perforated section 72 and extending from the wall of the tower is a sloping trap member 75 having vertical portion 76 forming a weir. Attached to the underside of perforated section 72 are baffles 77, 78, 79, 80. These baffles are indicated in the drawing as being of different lengths. However, they may all be of the same length if desired.

When operating tower 70 for the contacting of oil with phenol, for example, phenol is introduced at the top and oil at the bottom. The phenol or heavy phase fills the downcomers and forms a layer on the top of each plate. The oil or light phase forms a layer beneath each plate and due to the gravity differential in the tower, jets through the dispersion section 72 into the overlying layer of phenol. In general, the interface between the oil and the phenol will lie below the top of the weir 76, thus providing a seal whereby the phenol is prevented from by-passing any trays at very low flow rates as often occurs in towers of the type described in Figure 1. At these very low oil flow rates the oil-phenol interface is at the lower edge of baffle 77 and thus none of the oil passes through plate 71 since there are no dispersion holes in the plate in the section between weir 76 and baffle 77. As the oil flow rate is increased and the need for dispersion through plate 71 increases, the interface falls below the edge of baffle 77 and the oil overflows into the next section defined by baffles 77 and 78. Here the oil jets upwardly only through the holes in the perforated section of plate 71 defined by baffles 77 and 78. As the oil rate increases, the oil finally overflows into the section defined by baffles 78 and 79, where more dispersion holes become available. As the rate is increased more, the oil finally overflows into the section defined by baffles 79 and 80, increasing the number of dispersion holes still more. Finally, if excessively high oil rates are used, the excess oil flows over the last baffle 80 and passes into the mixing section without passing through the dispersion plate.

The tower described in Figure 11 offers the following advantages:

1. No bypassing of the heavy phase.
2. Orifice hole size is adjusted to give maximum extraction efficiency and is not so critically dictated by oil flow rate.
3. Hole size and dispersion area of the plate are independent with the dispersion area automatically controlled by the oil flow rate.
4. Much less operator attention is required.
5. Excess oil flow is bypassed into the mixing zone of the next stage above.

To illustrate the advantages of the variable dispersion plate of the present invention as contrasted to conventional fixed dispersion plates, the following table sets forth calculations which have been made of the variation in flow rate which could be obtained at heads of one inch and ten inches of oil under various types of dispersion plates. The one inch head is considered the minimum possible to prevent tray dumping while ten inches is considered adequate for good mixing and settling.

*Calculated comparison of flow rate flexibility for fixed area and variable area plates*

[Basis: 1 sq. ft. of hole area—1 inch diameter holes. Density difference between phases=0.1 g./cc. Oil density=approx. 1.0 g./cc. for calc.]

CASE I.—FIXED DISPERSION AREA AS IN EXISTING TOWERS

1″ Head: Vol. oil (cu. ft./sec.)$=1.0\sqrt{64.4 \times \frac{.1}{12}}=\sqrt{.537}=.73$ ft.³/ft.²/sec.

Dispersion hole area (sq. ft.)=5.5 gal./ft.²/sec.

10″ Head: Vol. oil (cu. ft./sec.)$=1.0\sqrt{64.4 \times \frac{1.0}{12}}=\sqrt{5.37}=2.31$ ft.³/ft.²/sec.

Dispersion hole area (sq. ft.)=17.2 gal./ft.²/sec.

CASE II—VARIABLE DISPERSION AREA TRAY

| | 1″ Head | | | 10″ Head | |
|---|---|---|---|---|---|
| Hole Overlap In.* | Area, Sq. Ft. | Flow Rate, Gals./Sec. | Hole Overlap In.* | Area, Sq. Ft. | Flow Rate, Gals./Sec. |
| .2 | 0.102 | 0.52 | .2 | 0.102 | 1.8 |
| .4 | 0.28 | 1.50 | .4 | 0.28 | 4.9 |
| .6 | 0.50 | 2.8 | .6 | 0.50 | 8.6 |
| .8 | 0.75 | 4.1 | .8 | 0.75 | 13.0 |
| 1.0 | 1.0 | 5.5 | 1.0 | 1.0 | 17.2 |

CASE III—VARIABLE AREA WITH BAFFLES AND TRAPS

[Baffles divide area into 4 equal parts of 0.25 ft.² maximum each]

| 1″ Head | | Number of Compartments Used | 10″ Head | |
|---|---|---|---|---|
| Holes Wide Open, Gals./Sec. | 0.2 Inch Open, Gals./Sec. | | Holes Wide Open, Gals./Sec. | 0.2 Inch Open, Gals./Sec. |
| 1.3 | .13 | 1 | 4.3 | 0.45 |
| 2.8 | .26 | 2 | 8.7 | 0.90 |
| 4.1 | .40 | 3 | 13 | 1.4 |
| 5.5 | .52 | 4 | 17.2 | 1.8 |

*Hole overlap or opening refers to linear distance, on hole diameters, of the hole opening.

The above data show that flow rate variation of 5.5 to 17.2 gal./sq. ft. per second is obtained between the above head limits for the fixed area orifice plate used conventionally in existing towers. By using the variable orifice tray, Case II, variation of 0.52 to 17.2 gal./sq. ft. per second can be obtained between the same head limits. This allows much wider variation in treat and capacity with good tray performance. Maintaining a constant head of 10 inches of oil, the variable orifice tray is capable of wider variation i n flow rate than is possible with the fixed area tray even when the head is allowed to vary for the fixed arear tray.

Even greater variation in flow rate is possible with the variable area tray equipped with traps and baffles. (Case III.) This tray is immune to dumping because of the trap and thus has no lower limit in oil flow rate. It can satisfactorily operate at a flow rate of 0.45 gal./sq. ft./sec. with 10 inches of head where the variable orifice tray without baffles would have less than 1 inch of oil head at this flow rate. Thus, the baffles allow operation at a constant head of 10 inches over a flow rate range of from 0.45 to 17.2 gal./sq. ft. per second compared to a range of from 1.8 to 17.2 gal./sq. ft. per second for the variable orifice tray without baffles. The baffles further allow hole size and total hole area to be varied independently while hole size and total hole area are dependent for the variable orifice tray without baffles.

The nature of the present invention having been thus fully set forth and specific examples of the same given, what is claimed as new, useful and desired to be secured by Letters Patent is:

1. In an apparatus of the character described, the combination which comprises, a shell, a vertical series of superposed trays disposed transversely of said shell, wherein each pair of adjoining trays defines a contacting zone transversely of the shell, each of said chambers including in succession a mixing and a settling section, said sections arranged alternately in diametrically opposed relation from chamber to chamber, conduit means extended from each tray into spaced relation to a next adjoining tray, said conduit means disposed in substantially diametrically opposed relation from tray to tray and each including an inlet portion opening from the settling section of a first chamber and an outlet portion opening into the mixing section of a next adjoining second chamber, an open section in each tray disposed in substantially diametrically opposed relation to said conduit means inlet portion, a perforate section in each tray immediately adjacent said open section and radially inward therefrom, said perforate section opening from the settling section of a third chamber into the mixing section of said second chamber, a baffle member in the settling section of each chamber mounted on the wall of said shell, and extending angularly therefrom toward a plate intermediate the chambers above and below said plate, and radially inward beyond the perforate section thereof, a radial series of spaced parallel baffle elements secured to said intermediate plate in perpendicular relation thereto within the limits of said perforate section, said elements extending outwardly from said plate into spaced relation to said baffle member, and means for varying the effective open area of said perforate section.

2. Contacting apparatus comprising in combination: a vertical shell, horizontally disposed plate elements fixed to one side of said shell at different heights therein terminating in spaced relation to the other side of said shell and each adjacent plate element being fixed to opposite sides of the shell, downcomer baffle elements extending from the said spaced termination of each plate toward the next adjacent plate forming a downcomer channel, said plate elements being characterized by an imperforate major portion and a perforated minor portion provided in a localized portion of the plate, perforated auxiliary baffle members having substantially the same number and arrangements of perforations, and means for supporting said auxiliary baffle members in sliding relation with said perforated portion of each of said plate whereby the degree of registration of the two sets of perforations may be varied.

3. The apparatus defined by claim 2 including a plurality of vertically positioned baffle elements extending from one side of said perforated portion of each plate at different distances from each downcomer, the vertical height of each of said vertically positioned baffle elements varying inversely with the distance from the downcomer.

4. A contacting plate construction including a plate element having a major imperforate portion and a minor perforated portion comprising a plurality of localized perforations arranged on a substantially horizontal section of said plate, parallel spaced baffle elements fixed to said perforated portion of the plate element extending vertically therefrom, each of said baffle elements having a different vertical height whereby the number of perforations available for fluid flow will be determined by the thickness of the fluid layer accumulating at the plate with respect to the said vertical baffle elements.

References Cited in the file of this patent
UNITED STATES PATENTS

| | | |
|---|---|---|
| 1,803,956 | Bergman | May 5, 1931 |
| 1,865,400 | McConnell | June 28, 1932 |
| 2,234,385 | Ryner | Mar. 11, 1941 |
| 2,288,958 | Smith | July 7, 1942 |
| 2,290,055 | Kinsey | July 14, 1942 |
| 2,652,316 | Williams | Sept. 15, 1953 |